United States Patent [19]

Schwarz

[11] Patent Number: 5,510,688
[45] Date of Patent: Apr. 23, 1996

[54] DRIVING SYSTEM AND METHOD FOR ELECTRONICALLY COMMUTATED MULTI-SPEED MOTORS

[75] Inventor: Marcos G. Schwarz, Joinville, Brazil

[73] Assignee: Empresa Brasileira De Compressores S/A-Embraco, Joinville, Brazil

[21] Appl. No.: 251,851

[22] Filed: May 31, 1994

[30] Foreign Application Priority Data

May 31, 1993 [BR] Brazil ..................... 9301879

[51] Int. Cl.⁶ ................................................ H02P 5/34
[52] U.S. Cl. ...................... 318/801; 318/778; 318/808
[58] Field of Search ............................... 318/801, 808, 318/778, 779, 254, 791, DIG. 2, 798–815; 62/168, 228.4

[56] References Cited

U.S. PATENT DOCUMENTS

| Re. 33,308 | 8/1990 | Millerd et al. | 318/DIG. 2 |
| 3,819,996 | 6/1974 | Habisohn | 318/778 |
| 4,453,118 | 6/1984 | Phillips et al. | 318/779 |
| 4,698,562 | 10/1987 | Gale et al. | 318/254 |
| 5,197,667 | 3/1993 | Bowsky et al. | 62/168 |
| 5,280,228 | 1/1994 | Kanouda et al. | 318/801 |
| 5,296,791 | 3/1994 | Hipp | 318/808 |
| 5,345,156 | 9/1994 | Moreira | 318/801 |

*Primary Examiner*—William M. Shoop, Jr.
*Assistant Examiner*—Karen Masih
*Attorney, Agent, or Firm*—Darby & Darby

[57] ABSTRACT

Driving system and method for an electronically commutated multi-speed motor having a coiled stator and a rotor with at least one permanent magnet and having an electronic circuit that feeds voltage to the coils (1, 2, 3) of the stator according to a relative rotor position as sensed by a sensor mounted to the motor shaft, or by interpreting the voltages induced to the stator coils by the moving rotor. A voltage is supplied to an inverter circuit (10) whose output is applied to motor stator coils (1, 2, 3). The voltage applied to the inverter circuit is varied, making use of a speed switching circuit that can include a voltage multiplier or a voltage divider circuit and the variation of the inverter output voltage varies the motor speed.

12 Claims, 5 Drawing Sheets

DRIVING SYSTEM AND METHOD FOR ELECTRONICALLY COMMUTATED MULTI-SPEED MOTORS

FIELD OF THE INVENTION

The present invention refers to a driving method for an electronically commutated multi-speed motor, with improved energy efficiency, and to the corresponding electronic driving circuit.

BACKGROUND OF THE INVENTION

Electronically commutated motors are of interest in applications requiring high efficiency and reliability, such as compressors for refrigeration, fans and pumps. Such motors consist of a coiled stator and a rotor with permanent magnets, the motor being supplied voltage by an electronic control that energizes the stator coils, according to a sequence and at times defined by a rotor position sensor, which is installed on the shaft, or making use of the voltages induced to the coils by the moving rotor, thereby imparting torque to the motor.

In some applications, such as for example hermetic compressors, the operation of these motors should offer the best energy efficiency, corresponding to the capacity of varying the motor working speed. There are a number of specific driving techniques for obtaining the speed control. One of the known techniques uses voltage variation supplied by the direct current bus of an inverter circuit. This requires a direct current supply unit with an adjustable voltage value, which is a disadvantage, since it is an additional circuit that causes losses to the system and requires active electronic components, which are rather sophisticated and of high cost.

Another solution used for controlling the speed of electronically commutated motors is by modulating the voltage induced to the motor coils, through techniques of the PWM type (pulse width modulation), controlling the average value of the output voltage and consequently the motor speed. This technique, even allowing a continuous speed adjustment through a source of fixed DC voltage, without using additional components and circuits in the system, has the drawback of generating high energy losses. The lower the running speed of the motor in relation to the maximum operative speed in which the motor can work, the higher will be said the energy losses. Such techniques, when applied to the refrigerating hermetic compressors with variable capacity, present during the operation thereof in low speeds, has the disadvantage of high energy consumption. Such energy consumption overcomes the advantage of reducing the energy consumption of said systems obtained by varying the refrigerating capacity of the compressor in the above cited conditions.

The energy losses in a system, according to the prior art including the motor and the electronic driving circuit basically consist of:

losses in the magnetic circuit of the motor, due to the variable magnetic flux, one part being due to the component in the fundamental frequency of the magnetic field, which, on its turn, is proportional to the rotational speed of the shaft, while the other part is due to the high frequency components in the magnetic field generated by the voltage modulation at a high frequency of the motor phases;

Joule losses in the wire of the motor winding, in the ohmic resistance of the electronic switches, inverter and other components provided in series with the current path, these losses being proportional to the square of the current and practically invariable with the shaft speed for a fixed value of the torque applied by the motor;

Joule losses in the inverter switches, due to switching and proportional to the frequency at which switching occurs; and Joule losses in the remaining components of the command circuit, which are fixed for any speed or torque supplied by the motor.

An important amount of the energy losses of the system, according to the prior art, is that resulting from voltage modulation on the motor phases for speed control. FIG. 2 illustrates the shape of the voltage wave A, modulated in pulse width. In this modulation technique, by using a fixed voltage whose value is A, there are obtained average voltages B, which may vary from zero to A, depending on the relation between the time periods t1 and t2, representing the average time for the voltage A to be applied within the total period.

$B = A \cdot t1/t2$

By modulating the voltage on the motor phases, a speed control is thus obtained, but with the disadvantage of presenting an increase of energetic losses. The lowest the running speed of the motor in relation to the maximum operative speed in which said motor can work, the higher will be said energy losses. Due to the high harmonic content of the voltage induced to the motor phases, causing losses specially when the operation is at a low speed, the efficiency of the system is reduced.

OBJECTS OF THE INVENTION

Thus, it is an object of the present invention to provide a system and a corresponding method for controlling the speed of electronically commutated motors, particularly motors used in hermetic compressors, presenting minimum losses during the operation of said motors, maximizing the efficiency of the system.

It is also an object of the present invention to provide a system and a method which use a simple and reliable circuit with low cost components.

It is a further object of the present invention to provide a system and a method employing circuits that allow a variable adjustment in the motor speed.

BRIEF DESCRIPTION OF THE INVENTION

These and other objectives are attained through a driving system for electronically commutated multispeed motors, used in a motor of the type which includes a stator, containing a plurality of coils and a rotor with permanent magnets. The motor is provided with an electronic circuit having an inverter circuit, including electronic switches supplied by a power source; a rotor position detecting circuit, which continuously receives information on the rotor position; a control unit, receiving information on the rotor angular position, through the rotor position detecting circuit and on the current flowing in the inverter circuit, in order to at least instruct the energization of the electronic switches of the inverter circuit, when said motor is required to operate. The circuit also has a motor speed shifting circuit, communicating the power source with the inverter circuit and including at least one speed shifting switch, disposed between the power source and said inverter circuit. The speed shifting switch has a closed operative position, when it feeds a certain voltage to the inverter circuit and to the motor, and an open inoperative position, when it feeds a fraction of said operative voltage to the motor. The operative and inoperative positions are achieved by an instruction coming from a speed shifting command means, external to the motor.

According to the present invention, the driving of motors including a circuit such as described above is achieved according to a method comprising feeding a DC voltage to the inverter circuit permitting that this voltage be fully applied to the stator coils and slightly varying this voltage value, in order to control the motor speed, by making use of a voltage variation circuit. This method includes the steps of: informing the control unit on the current flowing in the inverter circuit; instructing the electronic switches of the inverter circuit to operate according to an operative sequence for energizing the stator coils, as a function of the rotor position, in order to cause the rotation thereof; detecting the level of the current flowing in the motor and commanding the opening of the electronic switches of the inverter in abnormal situations of load, as well as during the start, thereby promoting the protection against damages caused by overcurrent in said electronic switches.

In the present invention, the speed control of the electronically commutated motor is accomplished by varying the voltage supplied to the inverter, by acting on the condition of a speed shifting switch, without using the technique of modulating the voltages on the motor phases. This eliminates the losses in the magnetic circuit of the motor and in the inverter switches usually found in the prior art.

BRIEF DESCRIPTION OF THE DRAWINGS

The invention will be described below, with reference to the attached drawings, in which.

BEST WAY OF CARRYING OUT THE INVENTION

Figure 1:
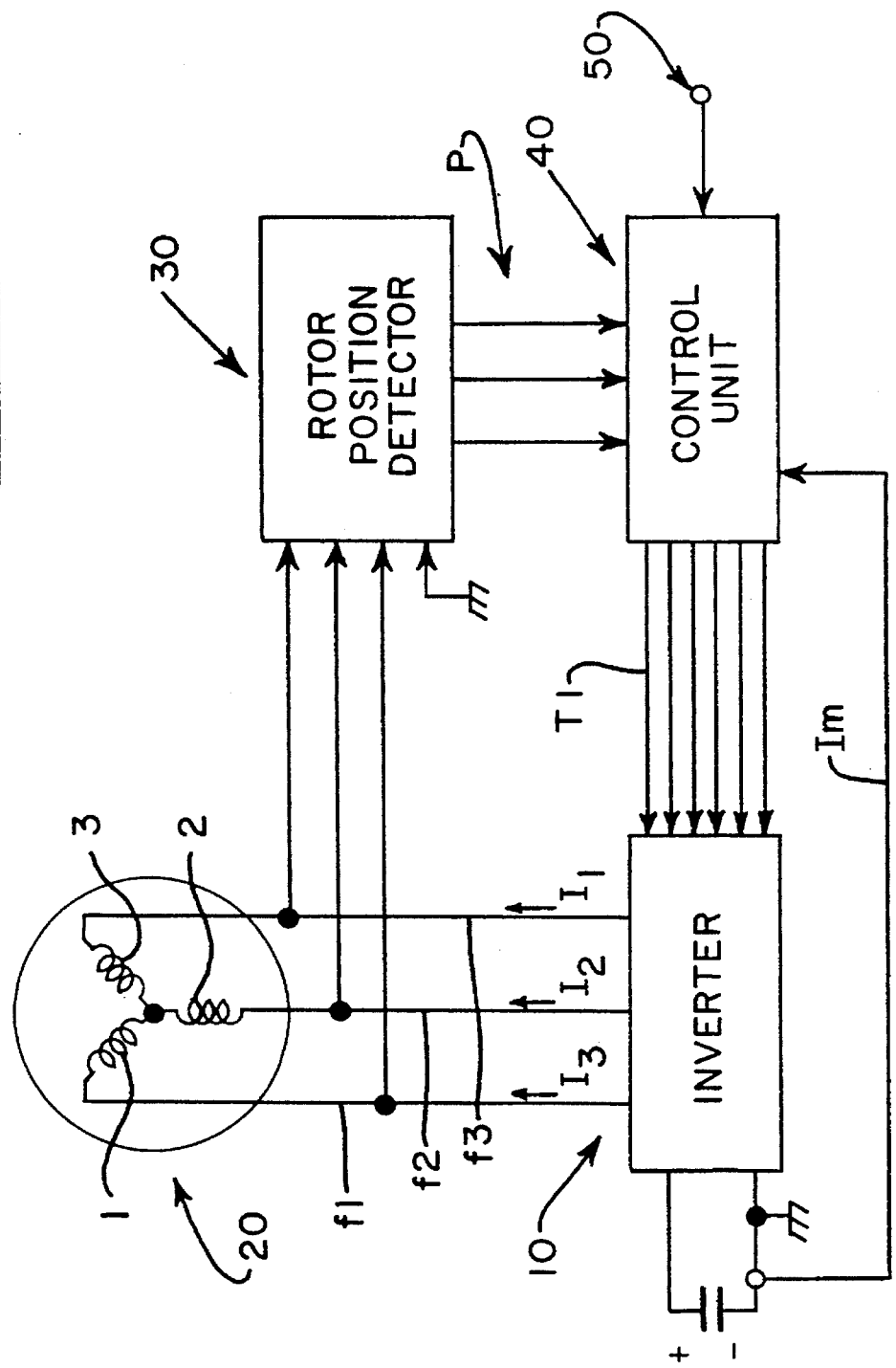
FIG. 1 illustrates a block diagram of a control circuit according to the prior art.
Figure 2:
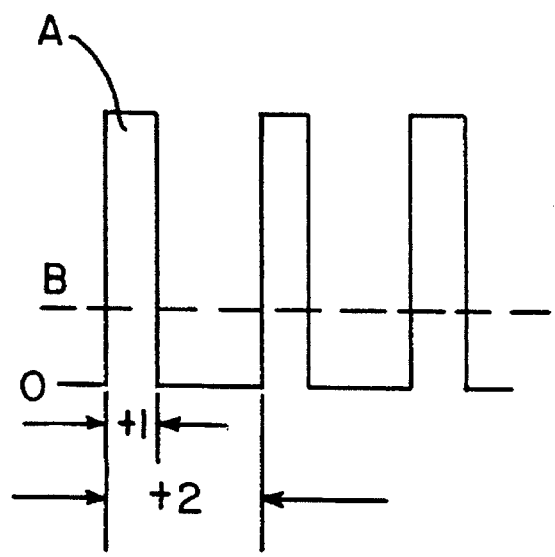
FIG. 2 illustrates a timing diagram of the motor currents, according to the prior art.
Figure 3:
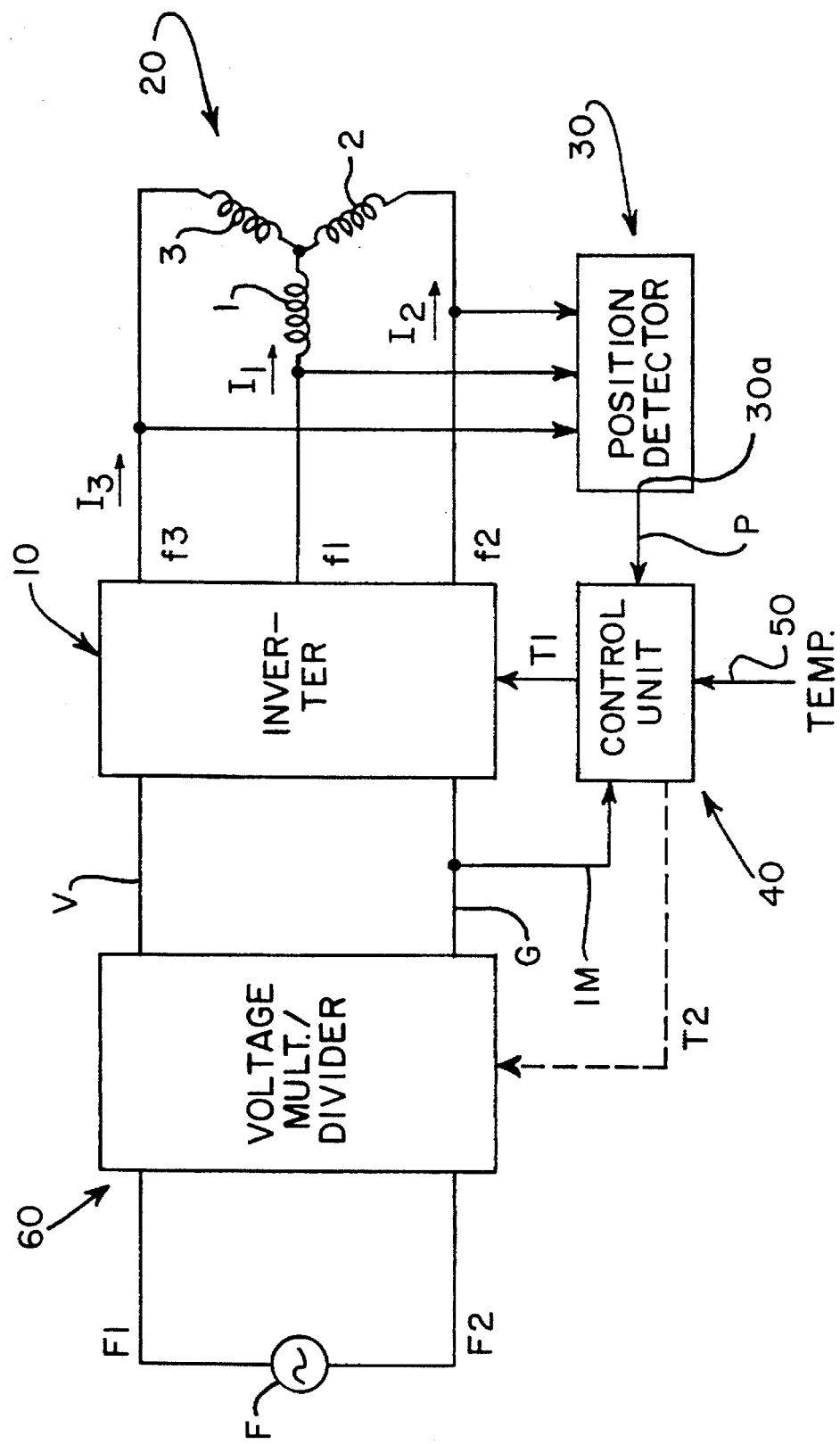
FIG. 3 illustrates a block diagram of the control circuit, according to the present invention.

As illustrated in FIGS. 1 and 3, an inverter circuit 10 applies currents I1, I2 and I3 to three phases f1, f2 and f3 of a brushless DC motor 20, of the electronically commutated type and formed by a coiled stator and by a rotor with permanent magnets, fed by a current supplied by a power source, particularly an AC supply source F. The voltages of the phases f1, f2 and f3 are also applied to a rotor position detecting circuit 30.

Through a terminal 30a, the detecting circuit 30 sends logic signals P to a control unit 40, informing the latter on the rotor position of the motor 20. Said control unit 40 also receives information on the current Im, flowing through the inverter 10, and on the temperature inside a cabinet to be refrigerated, said last information being supplied by a speed shifting command means, external to the motor 20. The information being processed and analyzed together with the information on the logic signals P, before being transformed and sent as command signals T1 to a plurality of electronic switches (not illustrated) of the inverter circuit 10 and, as a command signal T2, is applied to a speed shifting switch S1, disposed in a motor speed shifting circuit 60, for altering the voltage value V supplied to the inverter circuit 10.

In the prior art, when the temperature sensor detects a temperature value corresponding to a maximum value of a predetermined operative temperature range, the electronic switches of the inverter circuit 10 are sequentially conducted to a closed position, by action of the control unit 40, allowing the passage of current to the respective coil of the motor 20 and generating a magnetic field capable of rotating the rotor. In this solution, each said electronic switch is suddenly switched from a no-current condition to a maximum current condition. In order to avoid damages to the components of the circuit, through the continuous exposure thereof to the maximum current during a certain time of energization of each electronic switch, the solution of the prior art uses a continuous sequential switching of said electronic switches, during all the time of energization of said switches. Nevertheless, said solution results in energy losses to the system, since at each requirement for the compressor operation, the rotor of the motor 20 is constantly and sequentially changed from a stationary condition to a maximum load condition from the instant of the compressor start, this alternated variation being constantly maintained. This requires supplying a maximum current to the motor, even after its rotor has begun to rotate, when a current with such intensity is no longer required for maintaining the operation of said rotor.

The opening and closing of the switches of the inverter circuit 10 at a very high frequency, like that required in the prior art to maintain the current at the start intensity and even during its operative cycle, cause energy loss problems mainly in the magnetic circuit of the motor, due to the occurrance of eddy currents induced into steel plates that form the motor 20. This results significant loss when the motor is working at a very low speed.

This deficiency is solved by the present invention by using a voltage multiplier circuit, defined by the motor speed shifting circuit 60, which produces a multiplication of the feeding voltage V supplied to the inverter 10. Said multiplication, when due to a fractionary factor, causes, for example, a voltage division.

In a preferred illustrated embodiment, the speed shifting command means is a temperature sensor 50, which communicates with the control unit 40, informing the latter when the temperature inside the refrigerating cabinet of a refrigerating system including a compressor with a motor of the type described above reaches limit operative values, which are predetermined and defined in an ideal working temperature range of the refrigerating cabinet. The control unit 40 interprets electronically said temperature information, before determining a speed shift in the motor rotation.

In another embodiment, the speed shifting command means is an electromechanic thermostat 50, which directly commands the commutation of the speed shifting switch S1, as a function of the temperature conditions inside the cabinet, the control unit 40 being only responsible for the command of the operative sequence of the electronic switches. In another embodiment of the invention, the thermostat also commands the stop of the motor 20, when the temperature of the cabinet is at the lower limit of the ideal working range of the cabinet, as well as the start of said motor 20 when, after a time interval has elapsed in the stop condition of the motor 20, the temperature inside the cabinet reaches a value requiring the operation of the motor 20.

According to the prior art, the sequential energization of the coils 1, 2, 3 of the stator, as well as the amount of energy fed to said coils during the operation of the motor 20 in order to control the speed of the rotor, are achieved by switching the electronic switches of the inverter circuit 10.

According to the present invention, the speed shifting circuit 60 comprises a diode bridge, having a first pair of terminals X, connected to the power source F and a second pair of terminals Y, connected to a pair of input terminals, comprising terminals V and G of the inverter circuit 10.

Figure 4:
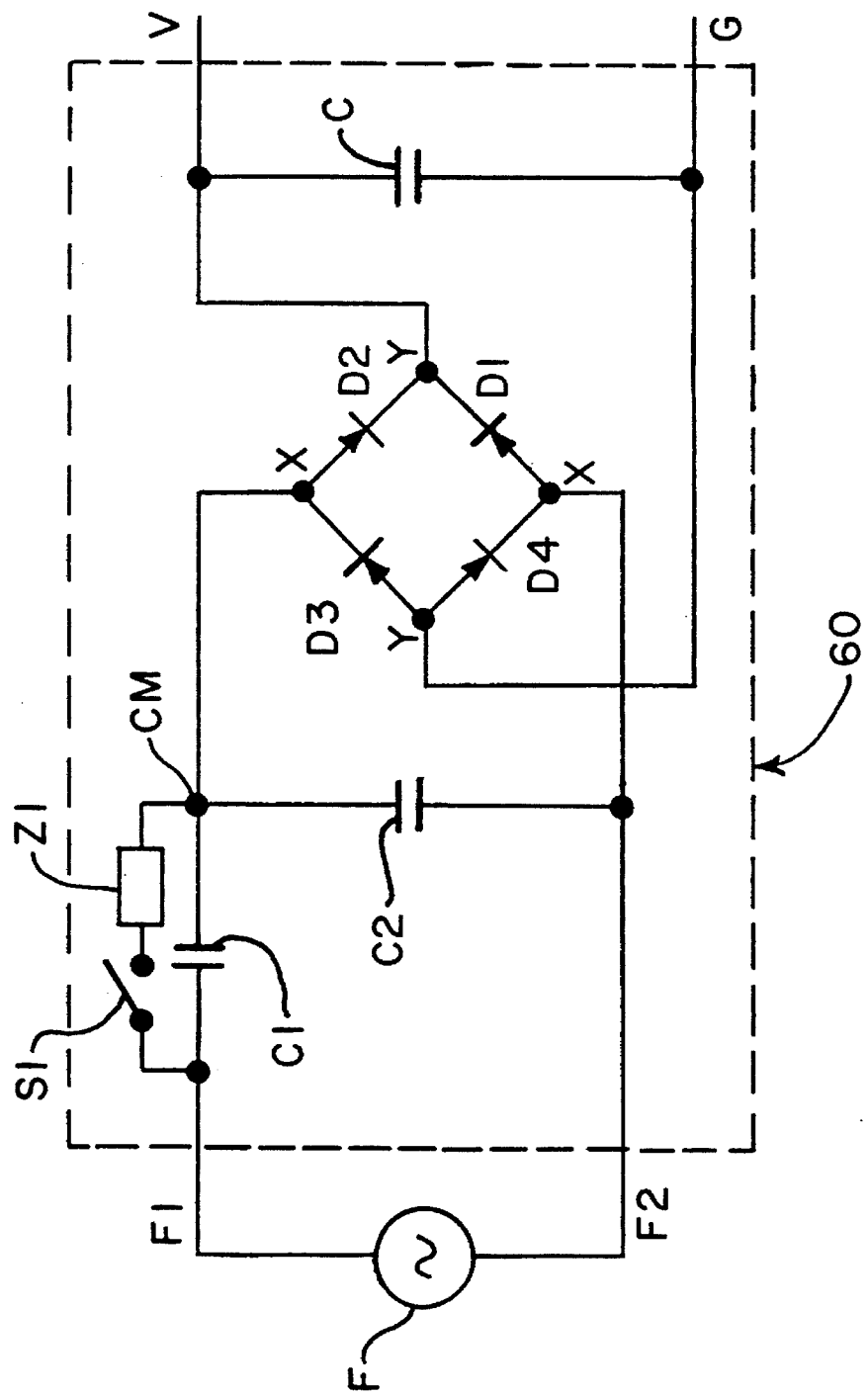
FIG. 4 illustrates a construction for the speed shifting electronic circuit, according to the present invention.

The diode bridge, as shown in FIG. 4, has first and second diodes D1, D2, each having a respective cathode, which is connected to a common point of the diode bridge, defining one of its pair of second terminals Y, and to the input terminal V of the inverter circuit 10. There also are and fourth diodes D3, D4, each having a respective anode connected to a common point of the diode bridge, defining the other second terminal Y thereof, and to the input terminal G of the inverter circuit 10.

In a preferred embodiment illustrated in FIG. 4, to the cathode of the third diode D3 and to the anode of the second diode D2 there is connected a respective end of a first capacitor C1 and of a second capacitor C2, while the anode of the first diode D1 and the cathode of the fourth diode D4 are connected to another end of a second capacitor C2. The first capacitor C1 presents an opposite end connected to a first terminal F1 of the power source F and to a first contact of the speed shifting switch S1, whose second contact is connected in series with an impedance Z1, interconnecting said second contact to a common point Cm between both capacitors C1 and C2. The second capacitor C2 has an opposite end connected to a second terminal F2 of the power source F. A capacitance C is connected between the input terminals V and G cited above. In this construction, the pair of capacitors C1, C2 defines a capacitive voltage divider, which attenuates the voltage from the power source F, when the speed shifting switch S1 is at its inoperative open condition. The existence of a voltage divider defines the circuit of FIG. 4 as a voltage divider circuit. The attenuation factor of the voltage will depend on the current that passes through the first capacitor C1. The attenuation obtained with this construction occurs with minimum Joule losses.

Figure 5:
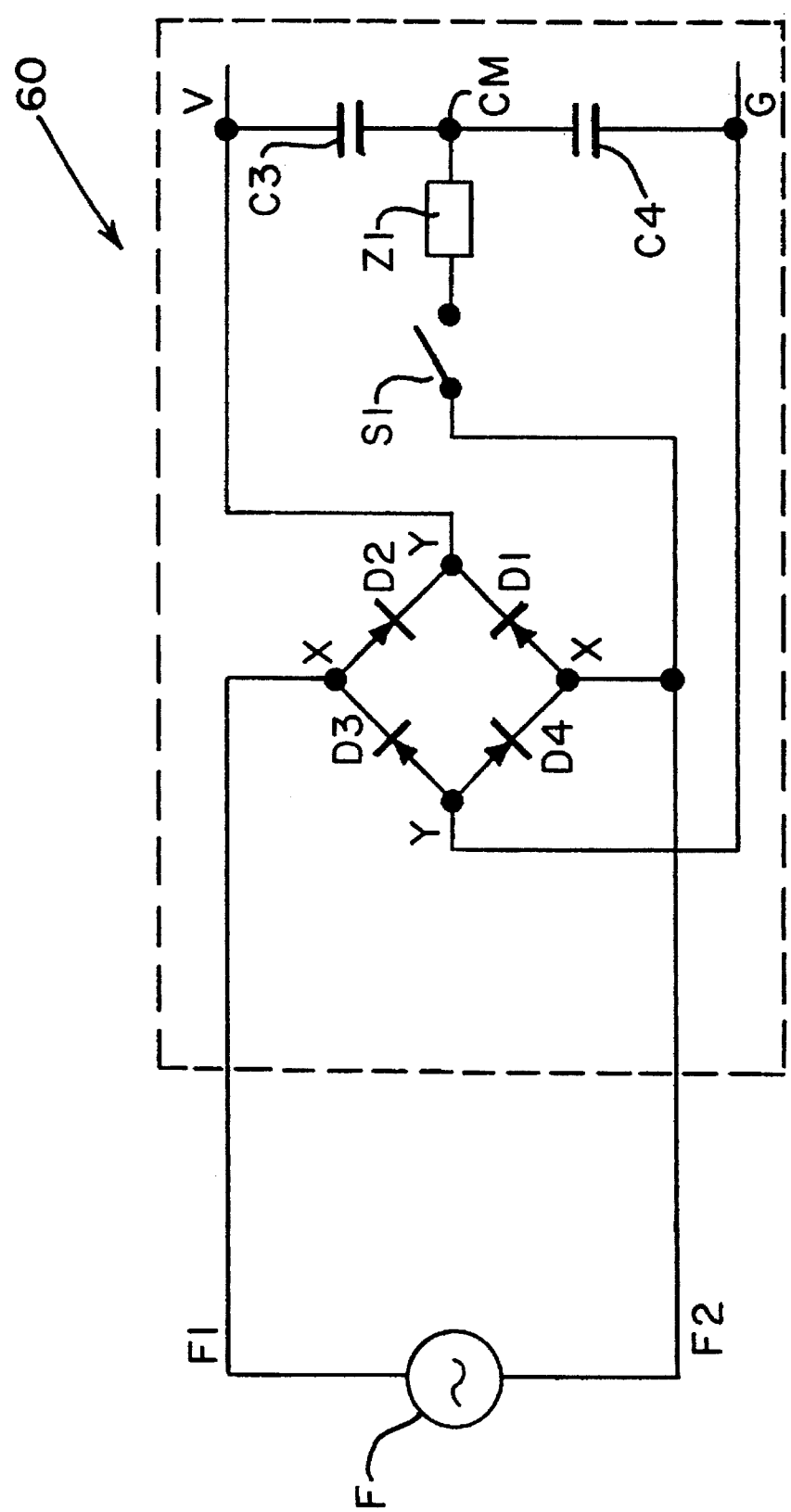
FIG. 5 illustrates a particular construction for the speed shifting circuit of FIG. 4, said circuit being a voltage multiplier.

According to what is illustrated in FIG. 4, the capacitance C corresponds to third and fourth capacitors C3 and C4, illustrated in FIG. 5. In this embodiment, said third and fourth capacitors C3, C4 are interconnected in series. To one end of the third capacitor C3, there is connected one of the second terminals Y of the diode bridge, while to the end (opposed to the first capacitor C3) of the fourth capacitor C4, there is connected the other of the second terminals Y of said diode bridge. In this embodiment, the anode of the first diode D1 and the cathode of the fourth diode D4 are connected to a common point, defining one of the first terminals X of the diode bridge and to the second terminal F2 of the power source F, while the anode and the cathode of both the second and third diodes D2 and D3 are interconnected to another common point that defines the other first terminal X of said diode bridge and to the first terminal F1 of the power source F.

In this construction, one of the terminals X is connected to a first contact of the speed shifting switch S1, whose second contact is connected to an impedance Z1, interconnecting said second contact to a common point Cm of both capacitors C3 and C4. The end terminals of both capacitors C3 and C4, connected to the cathodes and to the diodes D1 and D4 form, respectively, the positive and negative input terminals V and G, which feed the inverter circuit 10 of the control of the electrically commutated motor. In this embodiment, the capacitance defines a capacitive voltage multiplier, characterizing this circuit as a voltage multiplier circuit.

According to the present invention, each electronic switch of the inverter circuit 10 is only responsible for executing the operative sequence for energizing the stator coils, both for the start and for maintaining the rotation of the rotor.

Each electronic switch of the inverter circuit 10, upon being fed with the voltage from the power source F with a certain current I, generates a magnetic field, sufficient to make the rotor move in a desired predetermined rotational direction. In order to start the rotor rotation in a certain direction, the rotor position detecting circuit 30 informs the control unit 40 on the rotor position, in order to determine and instruct the inverter circuit 10 on the energizing sequence of the electronic switches of said circuit 10, in order to move said rotor of the motor 20 when the temperature sensor 50 detects a temperature requiring the change of condition of the speed shifting switch S1.

When the temperature inside the cabinet to be refrigerated reaches a value corresponding to a maximum value of a working temperature range of the cabinet, the temperature sensor 50 instructs the positioning of the speed shifting switch S1 to a closed operative condition, increasing the voltage fed to the inverter circuit 10 and, consequently, to the electronic switches of said inverter circuit 10. Said operative condition will remain, until the temperature reaches a certain value that allows the motor 20 to work at a reduced speed condition. The voltage increase means an increase in the magnetic field of the stator coils, which causes the rotor acceleration.

Figure 6:
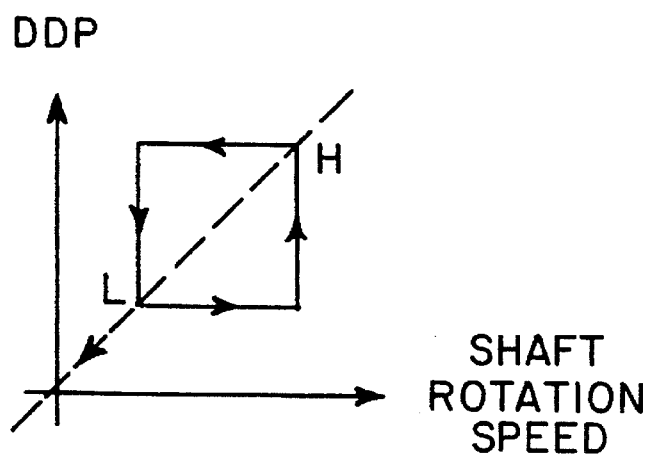
FIG. 6 illustrates a diagram of the phase voltage, in function of the speed of the motor shaft.

As illustrated in FIG. 6, the voltage V fed to the inverter 10 may have a high value H, which also corresponds to a high speed of the shaft of the motor 20, and a low value L, which corresponds to a low speed of said shaft. These two speed conditions correspond, respectively, to the opening and closing positions of the speed shifting switch S1.

According to what is illustrated in FIG. 4, when the speed shifting switch S1 is at the closed condition, the terminal F1 of the AC source F will be connected to the common point Cm, through the impedance Z1, the voltage at this point being substantially equal to the voltage at the terminal F1 and the AC voltage supplied by the power source F, existing between the terminal F2 and the common point Cm, being rectified at its full value by the diode bridge. The impedance Z1 will load, through the diode D2, the capacitance C with a positive peak voltage from the source F, while the terminal F2 will feed a negative voltage to said capacitance C, so that, between the positive input terminal V and the negative input terminal G of the inverter circuit 10 occurs a DC voltage with a peak value, substantially equal to the peak value from the power source F.

According to the illustration of FIG. 5, when the speed shifting switch S1 is at the closed condition, the terminal F2 of the AC source F will be connected to the common point Cm, through the impedance Z1. This impedance Z1 loads the capacitor C3, through the diode D2, with a positive peak voltage from the source F, and the capacitor C4 with a negative peak voltage from the source F. In this situation, the voltage at the common point Cm is substantially equal to the voltage at the terminal F2, resulting in a DC voltage between the positive input terminal V and the negative input terminal G of the inverter circuit 10 substantially equal to the double peak value supplied by the source F and corresponding to the maximum speed of the motor. According to FIG. 4, when the speed shifting switch S1 is with its contacts at an open condition, the capacitor C1 will be connected between the points F1 and Cm and will cause a voltage drop between said points, resulting in an AC voltage between the points F2 and Cm lower than the voltage fed by the source F. This attenuation depends on the value of the current drawn by the inverter circuit 10 and on the values of the capacitors C1 and C2. The attenuation factor may, therefore, be altered for any desired value, by just changing the proportion between the capacitors C1 and C2. The dependence of the voltage on the current drawn by the inverter circuit at the common point Cm may be attenuated by incresing the value of the capacitors C1 and C2, without altering the proportion therof.

Though not illustrated, the speed shifting circuit 60 may operate without the second capacitor C2. In this case, the attenuation of the voltage at the common point Cm will depend on the current drawn by the inverter circuit 10 and on the value of the capacitance C1.

According to FIG. 5, when the speed shifting switch S1 is with its contacts at an open condition, the capacitors C3 and C4, which are connected in series, will be loaded with the peak value of the AC voltage from the power source F, through the diodes D2 and D4 at the positive half-cycles and, through the diodes D1 and D3 at the negative half-cycles. Thus, the voltage between the points V and G, when S1 is open, will be proportional to the peak value from the source F.

As illustrated in FIG. 6, the motor 20 presents the speed of the shaft thereof directly proportional to the voltage applied to the phases f1, f2 and f3 of the stator. Thus, the opening and closing conditions of the speed shifting switch S1 will correspond to the high speed H and low speed L conditions of the motor shaft.

I claim:

1. An electronic circuit for a driving system operable from a power source for an electronically commutated multi-speed motor which includes a stator having a plurality of coils and a rotor with at least one permanent magnet, comprising:

an inverter circuit having an input and including at least one electronic switch for supplying voltage to the motor;

a rotor position detecting circuit which continuously receives information on the rotor position;

a control unit receiving information on the rotor angular position from the rotor position detecting circuit and information of the current flowing in the inverter circuit to instruct the energization of the electronic switches of the inverter circuit when said motor is required to operate;

speed shifting command means external to said motor;

a motor speed shifting circuit connected between the power source and the inverter circuit input, said motor speed shifting circuit receiving voltage from the power source and operating in response to said speed shifting command means by which it selectively operates to supply a first value of operating voltage to the inverter circuit input so that the inverter operates to provide the motor with a voltage of a level that causes the motor to run at a first working speed and to supply to said inverter circuit input a second value of operating voltage lower than said first value so that said inverter circuit operates to provide said motor with a voltage at a level to run at a reduced speed.

2. System according to claim 1 wherein said motor speed shifting circuit comprises one of a voltage multiplier and a voltage divider.

3. System as in claim 1, wherein said motor speed shifting circuit comprises:

a diode bridge having a first pair of terminals connected to the power source and a second pair of terminals respectively connected to a pair of input terminals of the inverter circuit; and a capacitance for connecting the speed shifting switch to the input terminals of the inverter circuit.

4. System as in claim 3, wherein said motor speed shifting circuit comprises a voltage multiplier circuit.

5. System as in claim 4, wherein said capacitance comprises a pair of capacitors, each connecting said speed shifting circuit to one of said inverter terminal input terminals.

6. System as in claim 3, wherein said motor speed shifting circuit comprises a voltage divider circuit.

7. System as in claim 6, wherein said motor speed shifting circuit further comprises a capacitive voltage divider between the power source and the first pair of terminals of the diode bridge, said divider attenuating the voltage from the power source when the speed shifting circuit is in the second state.

8. System as in claim 7, wherein said capacitive voltage divider comprises first and second capacitors, the first capacitor having one terminal connected to the power source and its other terminal connected to one of the first pair of terminals of the diode bridge, and the second capacitor having each of its terminals respectively connected to one of the terminals of the first pair of terminals of the diode bridge.

9. System as in claim 3, wherein the speed shifting circuit further comprises an impedance in series with the speed shifting switch.

10. System as in claim 1, used in a refrigerating system, wherein the speed command means comprises a temperature sensor operatively connected to said control unit to change the speed shifting circuit between its first and second states as a function of the temperature condition of a medium monitored by said temperature sensor.

11. System as in claim 10, wherein the speed command means comprises an electromechanical thermostat which instructs the change of the speed shifting circuit whenever the temperature measured of the medium being monitored requires a change in the operative speed of the motor.

12. Driving method operable from a power source for an electronically commutated multi-speed motor of the type including a stator with a plurality of coils and a rotor with at least one permanent magnet, comprising the steps of:

providing an electronic circuit comprising an inverter circuit having an input and including electronic switches to supply voltage to the motor; a rotor position detecting circuit which continuously receives information on the rotor position; a control unit receiving information on the rotor angular position from the rotor position detecting circuit and information of the current flowing in the inverter circuit to instruct the energization of the electronic switches of the inverter circuit when said motor is required to operate;

a. informing the control unit of the current flowing in the inverter circuit;

b. instructing the electronic switches of the inverter circuit to operate according to a predetermined operative sequence for energizing the stator coils, as a function of the rotor position to cause rotation of said rotor;

c. instructing the closing of a speed shifting switch of a motor speed shifting circuit that receives input voltage from the power source and supplies voltage to the input of the inverter circuit to apply to the inverter circuit an increase in the voltage level as compared to when said switch is open and when said speed command means requires a change in the operative speed of the motor by changing the level of the voltage supplied to the inverter circuit input and the consequent change of the operating voltage supplied by the inverter to the motor; and d. instructing the opening of the speed shifting switch to operate the motor speed shifting circuit to apply a voltage variation to the input of the inverter circuit as compared to when said switch is closed to change the level of the voltage to the inverter circuit input and the output voltage of the inverter supplied to the motor when said speed command means requires a change in the operative speed of the motor.

* * * * *